United States Patent
Bowes et al.

(10) Patent No.: US 7,084,361 B1
(45) Date of Patent: Aug. 1, 2006

(54) HIGH VOLTAGE INTERLOCK SWITCH

(75) Inventors: Christopher J. Bowes, Indianapolis, IN (US); Michael J. Howenstein, Zionsville, IN (US); Ted R. Kisielewski, Avon, IN (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 11/232,728

(22) Filed: Sep. 22, 2005

(51) Int. Cl.
*H01H 21/54* (2006.01)

(52) U.S. Cl. ............. 200/16 R; 200/51.07; 200/43.22; 307/10.7; 439/189; 439/923; 439/79

(58) Field of Classification Search .... 200/16 R–16 F, 200/1 R, 51 R, 43.01–43.02, 43.22, 51.07–51.09; 307/10.7, 10.2, 125; 439/510, 489, 189, 439/923, 377, 507–514, 79–80, 64, 49
See application file for complete search history.

(56) References Cited

U.S. PATENT DOCUMENTS

| 4,798,968 | A |   | 1/1989 | Deem |  |
|---|---|---|---|---|---|
| 4,859,201 | A | * | 8/1989 | Marsh | 439/290 |
| 4,866,221 | A | * | 9/1989 | Obermann et al. | 200/5 R |
| 5,281,165 | A | * | 1/1994 | McCleerey et al. | 439/510 |
| 5,336,859 | A | * | 8/1994 | Wojtanek et al. | 200/315 |
| 5,416,286 | A |   | 5/1995 | Dixon, Jr. |  |
| 6,087,737 | A |   | 7/2000 | Alksnat |  |
| 6,761,577 | B1 | * | 7/2004 | Koehler | 439/489 |

* cited by examiner

*Primary Examiner*—K. Lee
(74) *Attorney, Agent, or Firm*—Christopher DeVries

(57) ABSTRACT

A switch device for assembly with a fastener securing an access cover to a high voltage storage device includes a switch connector device connectable to a shroud. The switch connector includes a flange with a bolt hole through which a fastener passes and a first connector having a shorting bar. The shroud includes a second connector with first and second wire cables, mateable to the first connector. The switch device has open and closed positions. In closed position, the shroud is mated to the switch connector device, and conducts electrical signals between the first and second wire cables. The shroud substantially completely obstructs operative access to the fastener. In open position, the shroud is sufficiently unmated from the switch connector device to permit operative tool access to the fastener. The first connector is disconnected from the second connector when in the open position.

18 Claims, 5 Drawing Sheets

HIGH VOLTAGE INTERLOCK SWITCH

TECHNICAL FIELD

This invention pertains generally to voltage interlock systems, and more specifically to a high voltage interlock switch system.

BACKGROUND OF THE INVENTION

Manufacturers of systems employing circuits which transmit electrical power, including modern vehicle propulsion systems, are generally aware that it is not desirable for a service technician or other individuals to have physical contact with components or systems that are at elevated voltage levels. Typical high-voltage power systems employ energy storage devices requiring a certain amount of time to discharge stored electrical power prior to access. Examples of such energy storage devices include batteries, inductors, and capacitors. The potential energy of any such device must be discharged or dissipated before contact may safely occur. The process of discharging electrical energy takes a finite amount of time. To prevent premature physical contact, such systems often employ barriers to access, such as protective covers, and lock-out devices, which are elements of an interlock system.

An example of an interlock system is a high-voltage interlock system ('HVIL'). A typical HVIL system employs one or more devices to open an electrical circuit to prevent current flow, or delay timers to permit discharge of a storage capacitor before access is permitted. An exemplary HVIL circuit includes a current-sensing device, referred to as an HVIL control circuit, placed electrically in series with a network of electrical switches. Each switch is attached to accessible components in a network supplied by a common power source. The HVIL control circuit functions as a monitoring system to assure electrical current (or voltage) in the HVIL loop stays within predetermined limits, and as an actuation device that can initiate all actions and processes necessary to discharge electrical power from all devices in the network. A schematic of an exemplary HVIL system is shown with reference to FIG. 1.

Presently available electrical switch devices for use in limiting access to a device in a HVIL system are costly, bulky devices that may permit premature access to an electrical system. Such switch devices may be difficult to reinstall into a system after service. Therefore, what is needed is a small, low-cost, low-mass device for use with an HVIL system to prevent premature or inadvertent contact with elevated voltage levels in an electrical system, especially one on a vehicle.

SUMMARY OF THE INVENTION

The purpose of a high-voltage interlock loop ('HVIL') system is to prevent exposure to the danger of contact with elements of high-power electrical devices and components. The device of this invention has two functions. First, it acts as a switch in a circuit loop consisting of any number of similar switches, any one of which, when opened, interrupts the flow of current through the entire loop. This opening of the circuit is a signal to a control device to take action to de-energize the high voltage power system. Second, because of its physical shape and design, it provides a time delay to a person attempting to access a component or subsystem of the high-voltage system. This invention includes a two-part device comprising a connector and shroud for a hold-down fastener of an access cover of the high-voltage system. To gain access to the fastener, one must remove the shroud of the two-part device from the connector. Separation of the two halves of the connector opens the circuit and exposes the access fastener. The time required to remove the bolt delays access to the protected high-voltage area. This delay may be increased by adding to the length of the bolt, and using a fastener that requires a unique tool to remove it. This device has a construction and material content similar to many common plastic overmolded electrical components. The connector preferably conforms to a current automotive industry standard connector system.

The device is preferably lightweight to minimize system mass, and provides a time delay in gaining access to the protected high-voltage area, by installing the device on the exterior of the access cover. The time delay allows the HVIL circuit controller time to fully de-energize the source of electrical energy. The device is preferably physically small, to allow a choice of mounting locations, including confined spaces. The switch device may be located anywhere a fastener such as a six millimeter bolt can be attached to the access cover of interest.

Therefore, in accordance with the present invention, a switch device for assembly with a fastener securing an access cover is presented. The switch device preferably includes a switch connector connectable to a shroud. The switch connector includes a first electrical connector having a two-pronged electrical current shorting bar. The shroud includes a second electrical connector with first and second wire cables, with the second connector mateable to the first connector. The switch device has a closed position, and, an open position. In the closed position, the shroud is mated to the switch connector device with the second electrical connector mated to the first connector and having the two-pronged shorting bar connected to the second connector to conduct electrical signals between the first and second wire cables. The shroud substantially completely covers at least a portion of the fastener securing the access cover. In the open position, the shroud is sufficiently unmated from the switch connector device to permit tool access to the fastener securing the access cover. The first connector is disconnected from the second connector when the device is in the open position.

Another aspect of the invention includes the switch connector having a flange with a bolt hole through which at least a portion of the fastener passes. Alternatively, the switch connector may be attached in alternate locations, and have anti-rotation features to prevent displacement of the shroud away from the fastener.

Another aspect of the invention includes the access cover permitting access to the high power device only when the device is in an open position and the fastener securing the access cover is physically removed therefrom.

Another aspect of the invention includes the high power device being an electrical energy storage device on a vehicle.

Another aspect of the invention includes a mating end of the first connector of the switch connector device facing directionally away from the flange portion.

Another aspect of the invention includes the fastener being a threaded bolt having a head, and removable only through use of a tool.

Another aspect of the invention includes the head of the threaded bolt being a conventionally-shaped head.

Another aspect of the invention includes the head of the threaded bolt being a specially-shaped head, requiring use of a specialized tool to effect insertion and removal.

Another aspect of the invention includes the mating end of the first connector of the switch connector device facing directionally towards the flange portion.

Another aspect of the invention includes the shroud having a sheath.

Another aspect of the invention comprises a device for securing an access cover, comprising the access fastener operable to secure the access cover; and, the switch device for restricting access to the access fastener.

Another aspect of the invention comprises a high voltage interlock loop system, including a high voltage electrical power device having an access cover, a switch device for mechanically securing the access cover, and, a control circuit for controlling electrical power to the high voltage electrical power device. The high voltage interlock loop system includes a series electrical circuit including: the switch device securing the access cover, and, the control circuit. The control circuit is operable to substantially de-energize electrical energy at the high voltage electrical power device when the switch device is in the open position.

Another aspect of the invention comprises a method for delaying access to the access cover of the high power electrical device. This includes securing the access cover of the high power electrical device with a fastener, and assembling a switch device with the fastener. Electrical energy to the high voltage electrical power device is de-energized when the switch device opened.

These and other aspects of the invention will become apparent to those skilled in the art upon reading and understanding the following detailed description of the embodiments.

BRIEF DESCRIPTION OF THE DRAWINGS

The invention may take physical form in certain parts and arrangement of parts, the preferred embodiment of which will be described in detail and illustrated in the accompanying drawings which form a part hereof, and wherein.

DETAILED DESCRIPTION OF THE PREFERRED EMBODIMENT

Figure 1:
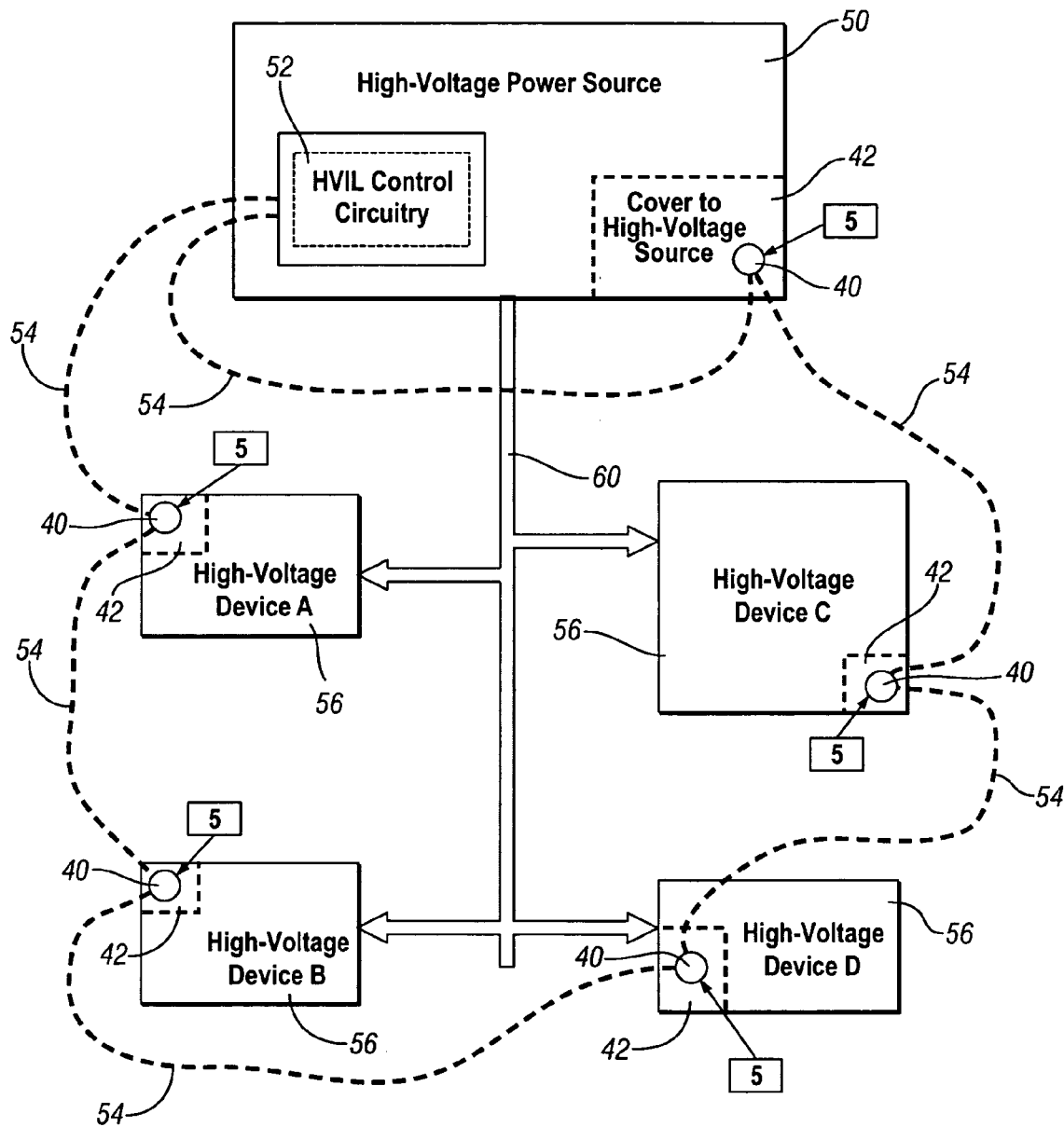
FIG. 1 is a schematic diagram of an electrical circuit, in accordance with the present invention; and, FIGS. 2 and 2A are schematic drawings of an embodiment of the device, in accordance with the present invention.

Referring now to the drawings, wherein the showings are for the purpose of illustrating the invention only and not for the purpose of limiting the same, FIG. 1 shows a schematic high-voltage interlock loop circuit which has been constructed in accordance with an embodiment of the present invention.

The exemplary high-voltage interlock loop circuit comprises a high-voltage power source 50, including a high-voltage interlock loop ('HVIL') control circuit 52. The high-voltage power source 50 distributes electrical power to a plurality of high voltage devices 56 via one or more electrical cables 60, each capable of carrying sufficient amount of electrical energy to meet needs of the specific high voltage device 56. The HVIL control circuit 52 is serially electrically connected to a plurality of HVIL switch devices 5 using a plurality of wire cables 54. The high-voltage interlock loop circuit is preferably created by the plurality of HVIL switch devices 5 and wire cables 54 connected in series, wherein the HVIL control circuit 52 monitors electrical conductivity in the electrical circuit created by the plurality of HVIL switch devices 5 and wire cables 54. When an open circuit condition is detected by the HVIL control circuit 52 in the aforementioned electrical circuit, it responds by deactivating power to all of the high voltage devices 56 attached to the electrical circuit of the HVIL control circuit 52. Devices and methods for detection of an open electrical circuit and de-energizing a high-voltage power source are known to a skilled practitioner, and not described in detail herein. Each of the HVIL switch devices 5 is operably connected to a hold-down fastener 40 that secures an access cover 42 for one of the high voltage devices 56, including the high-voltage power source 50. Each HVIL switch device 5 is designed and constructed to create an open circuit condition in the electrical circuit 52 when an operator seeks to gain access to one of the high voltage devices 56 through an access cover 42, by accessing and seeking to remove the hold-down fastener 40, as discussed hereinbelow.

Figure 2:
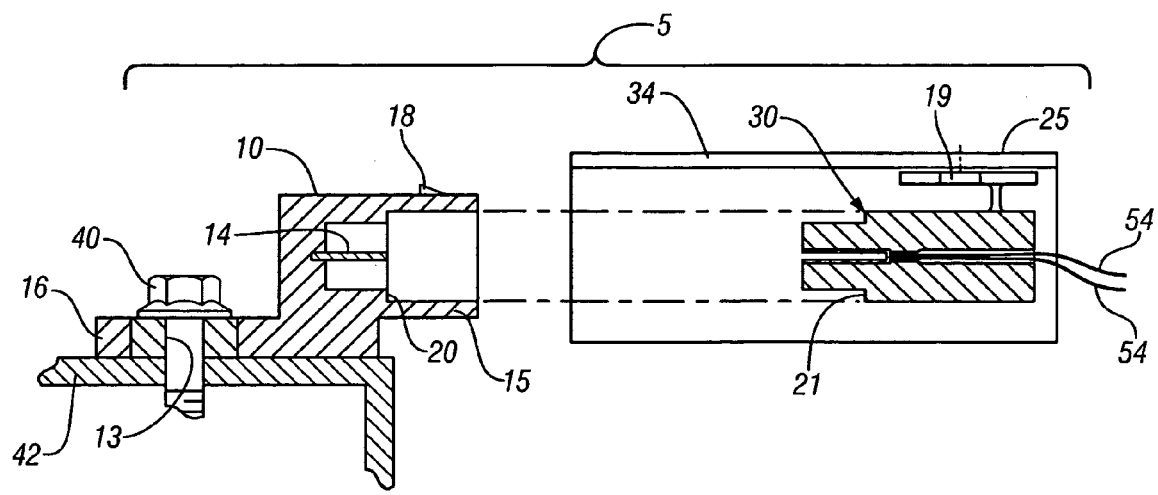
Figure 2A:
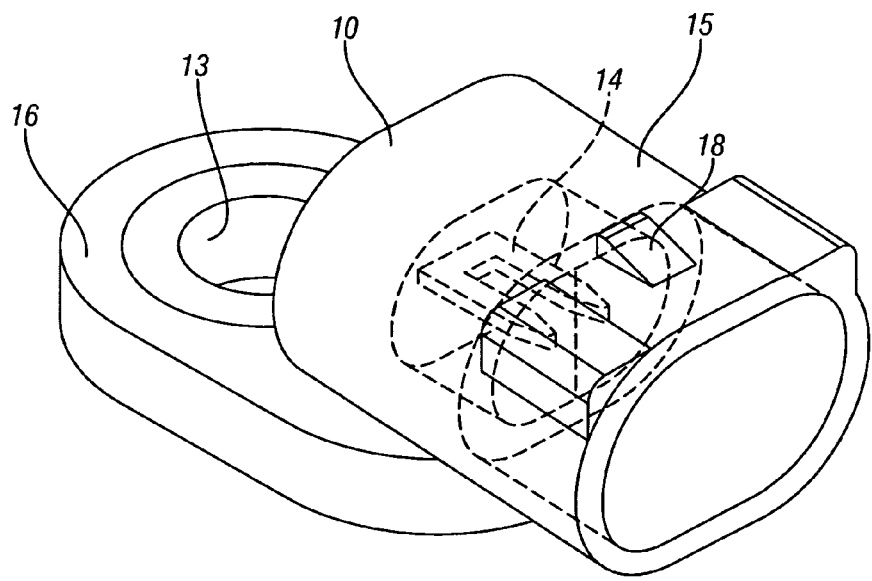

Referring now to FIGS. 2 and 2A, the HVIL switch device 5 of this embodiment is detailed. The HVIL switch device 5 preferably comprises a switch connector device 10 which is mechanically and electrically attachable to a shroud 25. The switch connector device 10 preferably comprises a single molded plastic piece having a flanged section 16 mechanically attached to a connector section 15, with the flanged section 16 and the connector section 15 shown in a linear design with a common axis in this embodiment. The flanged section 16 of this embodiment is a disc-shaped device substantially circular in cross-section with an opening 13 near the center of the section through which hold-down fastener 40 passes. The exemplary hold-down fastener 40 is a conventional six-millimeter diameter bolt having a head, shown in this embodiment as a hex-shaped head. The opening 13 is preferably in the range of seven to eight millimeters in diameter to receive the hold-down fastener 40. The connector section 15 preferably comprises a commercially available connector body, and formed to properly orient, mate, and lock in place a mating terminal connector 30 of the shroud 25. The mating end of connector section 15 is facing away from the flanged section 16 and head of bolt 40. Connector section 15 includes orienting features 20 and a lock feature 18, which mate with corresponding complementary features of the shroud 25. An electrical current shorting bar 14, comprising an electrically conductive piece formed in a substantially U-shape, is mounted within the connector section 15 in a position wherein the ends of the U-shape face outwardly, allowing electrical mating with connector 30 of the shroud 25.

As shown in this embodiment, the hold-down fastener 40 passes through the opening 13 of flanged section 16 of the switch connector device 10, with the hold-down fastener 40 covered by the shroud 25 when the connector device 10 is attached to the shroud 25. Therefore, any attempt to displace the shroud 25 covering the fastener 40 by rotating the HVIL switch device 5 is defeated because the pivot point for rotation is the fastener 40, and the shroud 25 remains in place over the fastener 40, preventing access.

The hold-down fastener 40 of this embodiment comprises the six millimeter diameter threaded bolt having a head, and is of sufficient length to secure the access cover 42 in place. In the exemplary embodiment shown in FIG. 2, an operator is physically prohibited from removing the access cover 42 until the hold-down bolt 40 has been completely removed from the high voltage device 56. A skilled practitioner is able to design an access cover requiring complete removal of hold-down bolt 40. It is preferable that the hold-down fastener 40 be removable only by an operator applying a tool to the head of the fastener. The head of the hold-down fastener 40 is designed to allow the fastener 40 to be inserted and removed with a conventional tool, such as a conventionally-sized end wrench or socket when the head is hex-shaped. Alternatively, the head of the hold-down fastener 40 may be specially configured, thus requiring use of a specialized tool for insertion and removal.

Length of the hold-down bolt 40 is selected appropriate to a specific application of the high voltage device 56, and may be varied by a skilled designer. Length or thread pitch of the hold-down bolt 40 may be varied in order to vary the amount of time elapsing from the time access to the bolt 40 is accomplished due to opening the HVIL switch device 5 until the bolt 40 is removed and the access cover 42 is removable.

Referring again to FIG. 2, the shroud 25 includes connector 30, wire cables 54, and a sheath section 34 overmolded onto the connector 30. The connector 30 is preferably a standard connector device designed to slideably mate with connector section 15 of the switch connector device 10, including corresponding complementary orienting features 21 and locking feature 19. The connector 30 is connectable to the electrical current shorting bar 14, when connected to the switch connector device 10. The sheath section 34 is preferably a plastic molded piece physically attached to the connector 30, with shielding extending from a front face of the connector 30 forward. When the HVIL switch device 5 is assembled, placing the switch device 5 in the closed position, the shroud 25 slideably mates and assembles onto the switch connector device 10, and the sheath section 34 fits substantially completely around the head of access bolt 40 to prevent operative access to the head with a removal tool, including, for example, a wrench, a socket, or a hand.

When the connector 30 is in the closed position, relative to the switch connector device 10, the switch connector device 10 is mechanically and electrically mated to the shroud 25, creating electrical continuity between wire cables 54 through the electrical current shorting bar 14.

An open position of the high-voltage interlock switch 5 preferably occurs any time the shroud 25 is displaced sufficiently to gain access to the head of hold-down bolt 40. When the shroud 25 is in an open position, relative to the switch connector device 10, the electrical current shorting bar 14 is electrically disconnected from the connector 30 of shroud 25, interrupting electrical continuity between wire cables 54, and opening the HVIL circuit 52.

Figure 3:
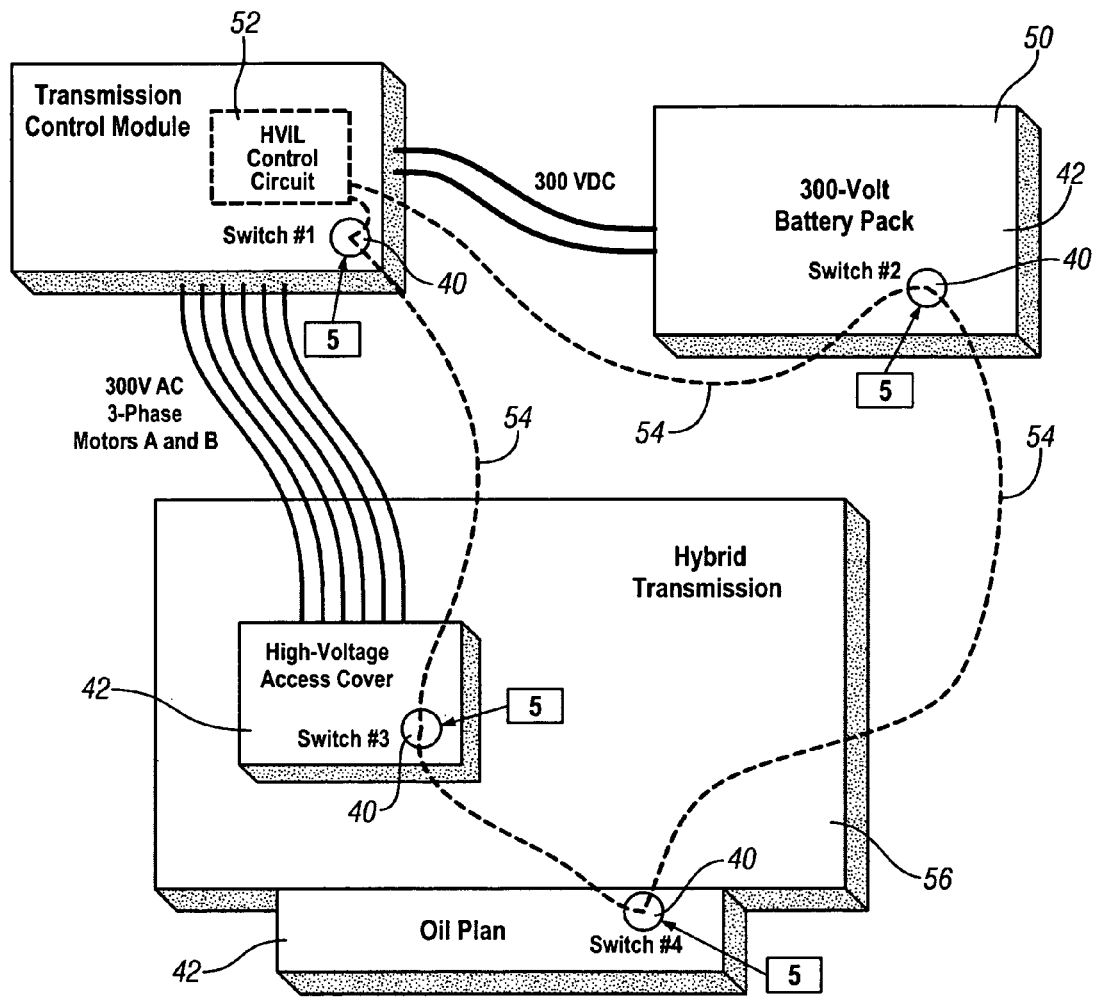
FIG. 3 is a schematic diagram of an exemplary electrical circuit, in accordance with the present invention; and, FIGS. 4, 5, 6, and 7 are alternate isometric drawings of embodiments of the device, in accordance with the present invention.

Referring now to FIG. 3, a schematic diagram of a specific embodiment constructed in accordance with the invention is detailed. The exemplary embodiment is an electrical power control system for a hybrid electromechanical transmission device. The high-voltage power source 50 of this embodiment is a 300-Volt battery power pack, which supplies electrical power to the hybrid electromechanical transmission device 56. A transmission control module contains the high-voltage interlock loop ('HVIL') control circuit 52, and is a protected device in the HVIL circuit. The transmission control module serves multiple functions related to operation of the hybrid electromechanical transmission device, including control of electrical power transmission between the 300-Volt battery power pack and the hybrid electromechanical transmission device. The HVIL control circuit 52 comprises one element of this overarching control module. Electrical power is distributed from the 300-Volt battery power pack to the hybrid electromechanical transmission device via the transmission control module. There is a plurality of HVIL switch devices 5, each serially electrically connected to the HVIL control circuit 52 via the wire cables 54. In this embodiment one HVIL switch device 5 is operably attached to hold-down bolt 40 for the 300-Volt battery power pack; one HVIL switch device 5 is operably attached to hold-down bolt 40 for the access cover 42 of the hybrid electromechanical transmission device; and one HVIL switch device 5 is operably attached to hold-down bolt 40 for the access cover of the control circuit. Furthermore, one HVIL switch device 5 is operably attached to hold-down bolt 40 for a transmission oil pan. In this embodiment, the HVIL control circuit 52 is able to de-energize the 300-Volt battery power pack, the hybrid electromechanical transmission device, and the transmission control module when any one of the HVIL switch devices 5 is opened.

Figure 4:
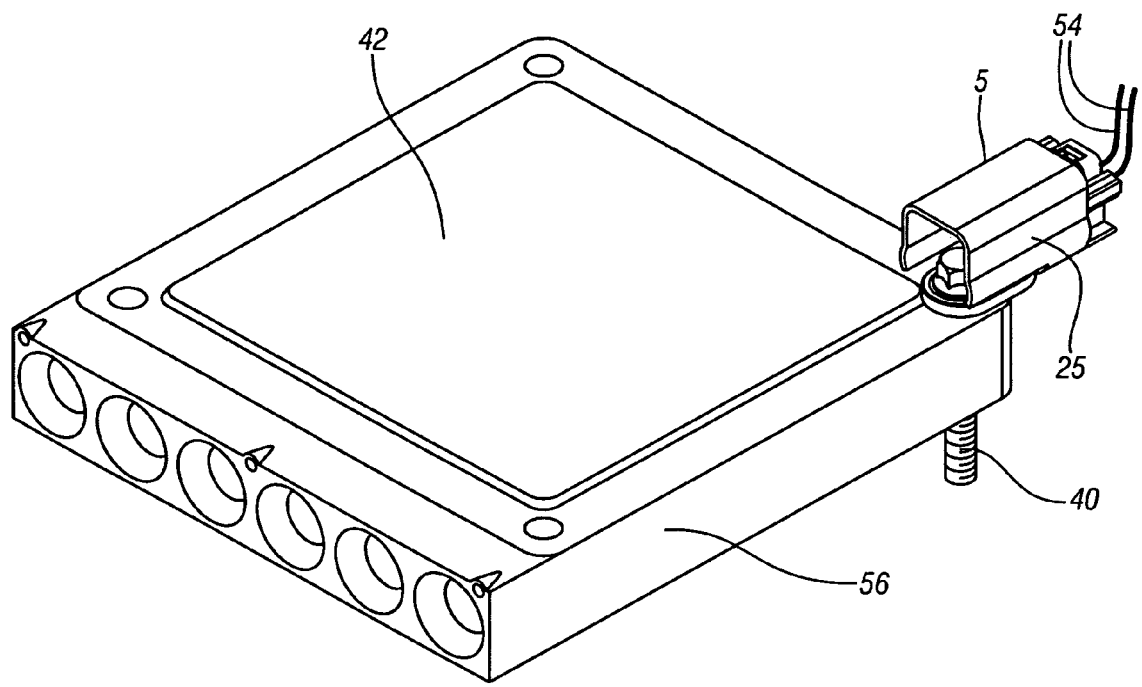

Referring now to FIGS. 4, 5, 6, and 7, alternate isometric drawings of embodiments of the device are shown. FIG. 4 shows a HVIL switch device 5 assembled onto an access cover 42 for a 300-Volt connection from the hybrid transmission to the vehicle battery power pack 56. The shroud 25, shown in closed position, effectively covers the head of the bolt 40.

Figure 5:
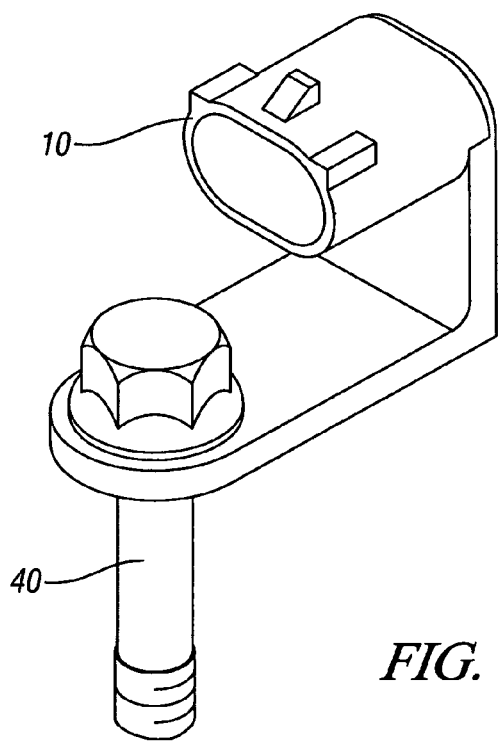
Figure 6:
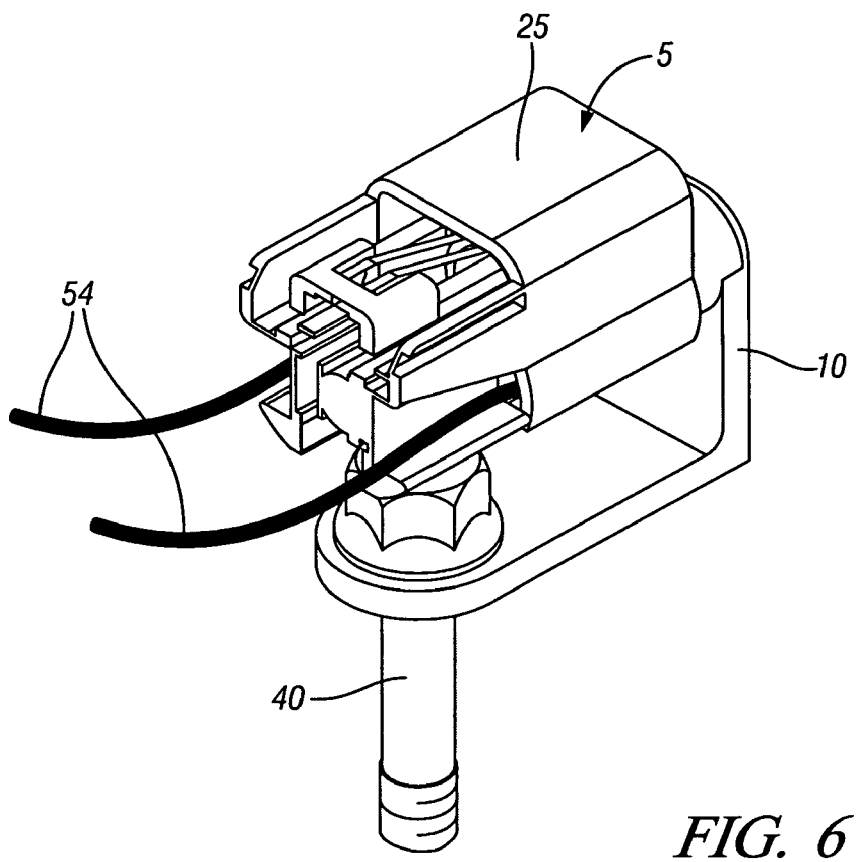

FIG. 5 shows an alternate embodiment of the switch connector device 10 portion of the HVIL switch device 5. In this embodiment, the switch connector device 10 preferably comprises a single molded plastic piece having flanged section 16 mechanically attached to connector section 15. The flanged section 16 and the connector section 15 shown in a linear design, as before. The connector section 15 in this embodiment is preferably moldably rotated to have the mating end of connector section 15 facing toward the flanged section 16 and head of bolt 40. Referring now to FIG. 6, when the shroud 25 is assembled to the switch connector device 10 to create the electrical connection, the shroud 25 comprises the body of the connector 30, without an additional sheath.

Figure 7:
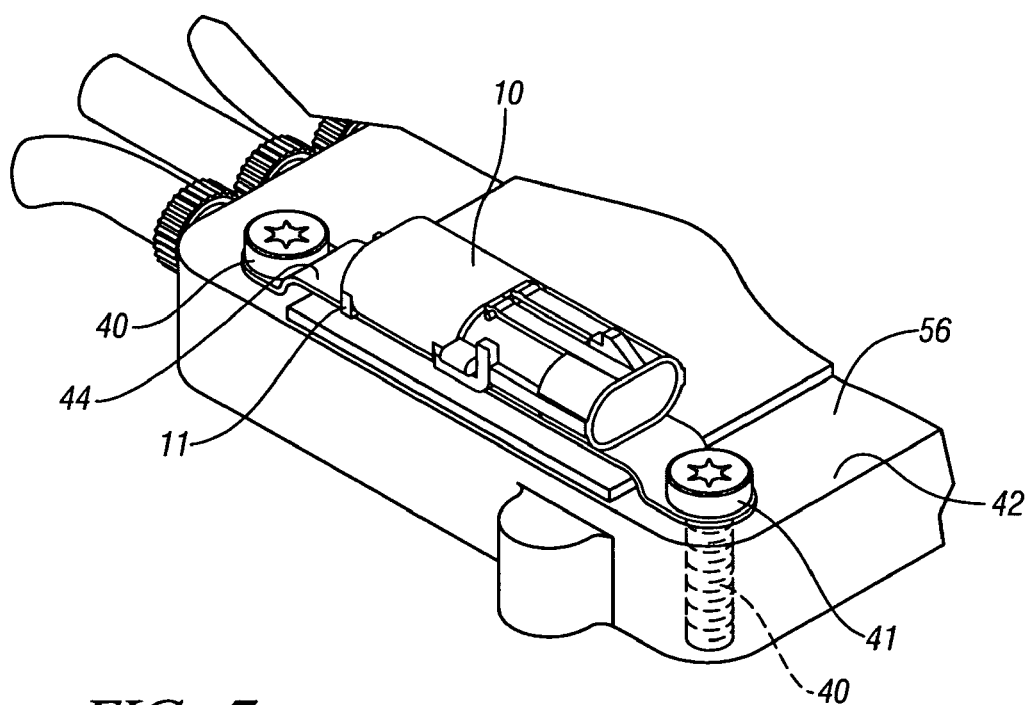

FIG. 7 shows another alternate embodiment of the switch connector device 10 portion of the HVIL switch device 5. In this embodiment, the connector device 10 portion of the HVIL switch device 5 is mounted on a strip 44 that is attached at its ends to at least two hold down fasteners 40, and having the shroud 25 (not illustrated in the Figure for clarity) fit substantially completely around the head 41 of one of the access fasteners 40 to prevent access to the head 41. In this embodiment, the strip 44 includes a second strip (not shown) affixed to strip 44, mounted in a cantilever location, and running parallel to the strip 44, about two millimeters off the surface of the strip 44. The connector device 10 portion of the HVIL switch device 5 includes mounting slots, by which the connector device 10 may be slidably mounted onto the strip 44. When the connector device 10 is mounted on the strip 44, as shown in FIG. 7, the connector device is rigidly fixed thereto, and unable to rotate. Alternatively, or in addition, anti-rotation tabs 11 may be added to the HVIL switch device 5. The anti-rotation tabs 11 prevent rotation of the HVIL switch device 5 on the strip 44. The shroud 25 may be assembled to the connector device 10, thus creating electrical continuity in the HVIL switch circuit through the device being protected. The function of mounting the connector device 10 configured as described hereinabove continues to be to prevent exposure of, or access to, at least one of the hold down fasteners 40 without corresponding disassembly of the HVIL switch device 5. Again, disassembly of the HVIL switch device 5 causes interruption of the HVIL switch circuit and powering down by the HVIL control circuit 52, as previously described. In this embodiment, the switch connector device 10 preferably comprises a single molded plastic piece, comprising the connector section 15 with a standard mounting device (not shown) mounted and attached thereon, for assembly and attachment to the strip 44. The standard mounting device replaces the flanged section 16 described with regard to other embodiments of the invention. The mounting slots and anti-rotation tabs 11 are preferably molded as a feature on the connector section 15, and are known and readily designable by a skilled practitioner. The switch connector device 10 preferably comprises a single molded plastic piece having the mating end of connector section 15 facing toward one of the heads 41 of one of the bolts 40 when assembled onto the strip 44. Therefore, when the shroud 25 is assembled to the switch connector device 10 to create the electrical connection, the shroud 25 fits substantially completely around the head 41 of one of the access fasteners 40 to prevent access to the head 41.

Alternatively, the HVIL switch device 5 is mounted onto the access cover 42 or the high voltage device 56 and oriented to have the shroud 25 fit substantially completely around the head 41 of one of the access fasteners 40 to prevent access to the head 41 when the HVIL switch device is assembled (not shown). In this embodiment, anti-rotation tabs are added to the HVIL switch device 5, or, the physical design of the access cover 42 or the high voltage device 56 include surface features to prevent rotation. The anti-rotation tabs or features prevent rotation of the HVIL switch device 5, thus preventing exposure of the access fastener without corresponding disassembly of the HVIL switch device 5.

The invention has been described with specific reference to the preferred embodiments and modifications thereto. Further modifications and alterations may occur to others upon reading and understanding the specification. It is intended to include all such modifications and alterations insofar as they come within the scope of the invention.

Having thus described the invention, it is claimed:

1. Switch device for assembly with a fastener securing an access cover, comprising:
   A) a switch connector device, comprising: a first electrical connector having a two-pronged electrical current shorting bar; and,
   B) a shroud, comprising: a second electrical connector having a first wire cable and a second wire cable, the second electrical connector mateable to the first electrical connector;
   C) the switch device: having a closed position, and, an open position;
     1) the closed position comprising:
     a) the second electrical connector mated to the first electrical connector,
     b) the two-pronged electrical current shorting bar connected to the second electrical connector, operable to conduct electrical signals between the first wire cable and the second wire cable, and,
     c) the shroud substantially completely covering at least a portion of the fastener securing the access cover; and,
     2) the open position comprising:
     a) the second electrical connector sufficiently unmated from the switch connector device to permit access to the fastener securing the access cover; and,
     b) the first connector electrically disconnected from the second connector when the device is in the open position.

2. The device of claim 1, wherein the shroud further comprises a sheath.

3. The device of claim 1, wherein the switch connector device further comprises: the first electrical connector having a position mounting device attached.

4. The device of claim 3, wherein the switch connector device further comprises: at least one anti-rotation tab.

5. The device of claim 1, wherein the switch connector device further comprises: a flange including a bolt hole through which at least a portion of the fastener passes.

6. The device of claim 5, comprising: a mating end of the first connector of the switch connector device facing directionally away from the flange portion.

7. The device of claim 1, wherein the fastener comprises a threaded bolt having a head, and removable through use of a tool.

8. The device of claim 7, wherein the head of the threaded bolt comprises a conventionally-shaped head.

9. The device of claim 7, wherein the head of the threaded bolt comprises a specially-shaped head.

10. The device of claim 1, wherein the fastener comprises a mounted threaded stud, and, a threaded nut assembleable thereon.

11. The device of claim 1, comprising: a mating end of the first connector of the switch connector device facing directionally towards the flange portion.

12. The device of claim 1, wherein the access cover permits access to a high power device only when the device is in an open position and the fastener securing the access cover is physically removed therefrom.

13. The device of claim 12, wherein the high power device comprises an electrical energy storage device on a vehicle.

14. Device for securing an access cover, comprising:
   1) an access fastener operable to secure the access cover; and,
   2) a switch device for restricting access to the access fastener, comprising:
   A) a switch connector device, comprising: a first electrical connector having a two-pronged electrical current shorting bar; and,
   B) a shroud, comprising: a second electrical connector having a first wire cable and a second wire cable, the second electrical connector mateable to the first electrical connector;
   C) the switch device: having a closed position, and, an open position;
     1) the closed position comprising:
     a) the second electrical connector mated to the first electrical connector,
     b) the two-pronged electrical current shorting bar connected to the second electrical connector, operable to conduct electrical signals between the first wire cable and the second wire cable, and,
     c) the shroud substantially completely covering at least a portion of the fastener securing the access cover; and,
     2) the open position comprising:
     a) the second electrical connector sufficiently unmated from the switch connector device to permit access to the fastener securing the access cover; and,
     b) the first connector electrically disconnected from the second connector when the device is in the open position.

15. Voltage interlock loop system, comprising:
   1) a high voltage electrical power device having an access cover, a switch device for mechanically securing the access cover, and, a control circuit for controlling electrical power to the high voltage electrical power device; and, 2) a series electrical circuit including: the switch device for mechanically securing the access cover, and, the control circuit;
3) the switch device comprising:
   A) a switch connector device, comprising: a first electrical connector having a two-pronged electrical current shorting bar; and,
   B) a shroud, comprising: a second electrical connector having a first wire cable and a second wire cable, the second electrical connector mateable to the first electrical connector;
   C) the switch device: having a closed position, and, an open position;
      (1) the closed position comprising:
         (a) the second electrical connector mated to the first electrical connector,
         (b) the two-pronged electrical current shorting bar connected to the second electrical connector, operable to conduct electrical signals between the first wire cable and the second wire cable, and,
         (c) the shroud substantially completely covering at least a portion of the fastener securing the access cover; and,
      (2) the open position comprising:
         (a) the second electrical connector sufficiently unmated from the switch connector device to permit access to the fastener securing the access cover; and,
         (b) the first connector electrically disconnected from the second connector when the device is in the open position; and,
4) the control circuit operable to substantially de-energize electrical energy at the high voltage electrical power device when the switch device is in the open position.

16. The device of claim 15, comprising: a high voltage interlock loop system for securing a cover for a high voltage electrical power device on a vehicle.

17. Method to delay access to an access cover of a high power electrical device, comprising:

1) securing an access cover of the high power electrical device with a fastener;
2) providing a switch device comprising:
   A) a switch connector device, comprising: a first electrical connector having a two-pronged electrical current shorting bar; and,
   B) a shroud, comprising: a second electrical connector having a first wire cable and a second wire cable, the second electrical connector mateable to the first electrical connector;
   C) the switch device: having a closed position, and, an open position;
      1) the closed position comprising:
         a) the second electrical connector mated to the first electrical connector,
         b) the two-pronged electrical current shorting bar connected to the second electrical connector, operable to conduct electrical signals between the first wire cable and the second wire cable, and,
         c) the shroud substantially completely covering at least a portion of the fastener securing the access cover; and,
      2) the open position comprising:
         a) the second electrical connector sufficiently unmated from the switch connector device to permit access to the fastener securing the access cover; and,
         b) the first connector electrically disconnected from the second connector when the device is in the open position; and,
3) de-energizing electrical energy at the high voltage electrical power device when the switch device is in the open position.

18. The method of claim 17, wherein delaying access to the access cover of the high power electrical device further comprises: delaying access to the access cover of the high power electrical device on a hybrid electric vehicle.

* * * * *